United States Patent
Gecer Ulu et al.

(10) Patent No.: US 11,501,037 B2
(45) Date of Patent: Nov. 15, 2022

(54) MICROSTRUCTURES USING GENERATIVE ADVERSARIAL NETWORKS

(71) Applicant: Palo Alto Research Center Incorporated, Palo Alto, CA (US)

(72) Inventors: Nurcan Gecer Ulu, Sunnyvale, CA (US); Svytoslav Korneev, Stanford, CA (US); Saigopal Nelaturi, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 509 days.

(21) Appl. No.: 16/441,483

(22) Filed: Jun. 14, 2019

(65) Prior Publication Data
US 2020/0394275 A1    Dec. 17, 2020

(51) Int. Cl.
G06F 30/20 (2020.01)
G06N 20/20 (2019.01)
G06N 3/04 (2006.01)
G06N 3/08 (2006.01)
G06V 20/69 (2022.01)

(52) U.S. Cl.
CPC .......... *G06F 30/20* (2020.01); *G06N 3/0454* (2013.01); *G06N 3/088* (2013.01); *G06N 20/20* (2019.01); *G05B 2219/40534* (2013.01); *G06V 20/69* (2022.01)

(58) Field of Classification Search
CPC ...... G06F 30/20; G06N 20/20; G06N 3/0454; G06N 3/088
USPC .......................................................... 703/1
See application file for complete search history.

(56) References Cited

U.S. PATENT DOCUMENTS 10,699,055 B2 * 6/2020 Sha .................. G06F 30/27

OTHER PUBLICATIONS

Jiang_2018 (Data-driven Measurement discovery, 111/29/2016) (Year: 2016).*
Schumacher_2015 (Microstructures to Control Elasticity in 3D printing ACM Transactions on Graphics, vol. 34, No. 4, Article 136, Aug. 2015). (Year: 2015).*
Bostanabad_2016 (Stochastic microstructure characterization and reconstruction via supervised learning, Acta Materialia 103 (2016) (Year: 2016).*
Chan_2019 (Parametrization of stochastic inputs using generative adversarial networks with application in geology, Apr. 9, 2019) (Year: 2019).*
Denton_2017 (Semi-Supervised Learning with Context-Conditional Generative Adversarial Networks, ICLR 2017) (Year: 2017).*
Mosser_2017 (Reconstruction of three-dimensional porous media using generative adversarial neural networks, Physical Review E 96, 043309 2017) (Year: 2017).*

(Continued)

*Primary Examiner* — Brian S Cook
(74) *Attorney, Agent, or Firm* — Mueting Raasch Group

(57) ABSTRACT

A method for designing microstructures includes receiving at least one material property constraint for a design of at least one microstructure, the at least one microstructure configured to be a part of a larger macrostructure. At least one neighborhood connectivity constraint for the design of the at least one microstructure is received. One or more designs of the at least one microstructure is generated using a generative adversarial network (GAN) that is based on the at least one material property constraint and the at least one neighborhood connectivity constraint.

20 Claims, 14 Drawing Sheets

(56) References Cited

OTHER PUBLICATIONS

Park_2018 (MC-GAN: Multi-conditional Generative Adversarial Network for Image Synthesis, Aug. 15, 2018) (Year: 2018).*
Yang_2019 (Mcirostructural Material Design Via Deep Adversarial Learning Methodology, Jan. 4, 2019) (Year: 2019).*
Arjovsky et al., "Wasserstein GAN", Dec. 6, 2017, 32 pages.
Chen et al., "Computational discovery of extremal microstructure families", Science Advances, Jan. 19, 2018, 7 pages.
Goodfellow et al., "Generative Adversarial Nets", Jun. 10, 2014, 9 pages.
Guedes et al., "Preprocessing and Postprocessing for Materials Based on the Homogenization Method with Adaptive Finite Element Methods", Computer Methods in Applied Mechanics and Engineering, 83, 1990, pp. 143-198.
Jiang et al., "Data-driven metasurface discovery", Nov. 29, 2018, 14 pages.
Mao et al., "Least Squares Generative Adversarial Networks", Apr. 5, 2017, 16 pages.
Mirza et al., "Conditional Generative Adversarial Nets", Nov. 6, 2014, 7 pages.
Panetta et al., "Elastice Textures for Additive Fabrication", ACM Transactions on Graphics, vol. 34, No. 4, Article 135, Aug. 2015, 12 pages.
Park et al., "Mc-GAN: Multi-conditional Generative Adversarial Network for Image Synthesis", Aug. 15, 2018, 13 pages.
Pathak et al., "Context Encoders: Feature Learning by Inpainting", Nov. 21, 2016, 12 pages.
Radford et al., "Unsupervised Representation Learning with Deep Convolutional Generative Adversarial Networks", Jan. 7, 2016, 16 pages.
Reed et al., "Generative Adversarial Text to Image Synthesis", Jun. 5, 2016, 10 pages.
Schumacher et al., "Microstructures to Control Elasticity in 3D Printing", ACM Transactions on Graphics, vol. 34, No. 4, Article 136, Aug. 2015, 13 pages.
Zhu et al., "Two-Scale Topology Optimization with Microstructures", ACM Transactions on Graphics, vol. 36, No. 5, Article 164, Jul. 2017, 16 pages.

\* cited by examiner

MICROSTRUCTURES USING GENERATIVE ADVERSARIAL NETWORKS

STATEMENT REGARDING FEDERALLY SPONSORED RESEARCH AND DEVELOPMENT

This invention was made with Government support under HR0011-17-2-0030 Fields: fabricating With Interoperable Engineering, planning, design, and Analysis. The government has certain rights in this invention.

TECHNICAL FIELD

The present disclosure is directed to design of microstructures.

BACKGROUND

The present disclosure relates to designing of mechanical parts for multi-scale criteria. Modern parts are made with increasingly complex structures and multiple materials at high resolution using techniques such as additive manufacturing.

SUMMARY

Embodiments described herein involve a method for designing microstructures. At least one material property constraint is received for a design of at least one microstructure, the at least one microstructure configured to be a part of a larger macrostructure. At least one neighborhood connectivity constraint for the design of the at least one microstructure is received. One or more designs of the at least one microstructure is generated using a generative adversarial network (GAN) that is based on the at least one material property constraint and the at least one neighborhood connectivity constraint.

Embodiments described herein involve a system for designing microstructures. The system comprises a processor and a memory coupled to the processor. The memory stores computer executable instructions, that, when executed by the processor, cause the system to receive at least one material property constraint for a design of at least one microstructure, the at least one microstructure configured to be a part of a larger macrostructure. At least one neighborhood connectivity constraint for the design of the at least one microstructure is received. One or more designs of the at least one microstructure is generated using a generative adversarial network (GAN) that is based on the at least one material property constraint and the at least one neighborhood connectivity constraint.

Embodiments described herein involve a non-transitory computer readable medium that stores computer program instructions for designing microstructures. The computer program instructions when executed by a processor cause the processor to perform operations. At least one material property constraint is received for a design of at least one microstructure, the at least one microstructure configured to be a part of a larger macrostructure. At least one neighborhood connectivity constraint for the design of the at least one microstructure is received. One or more designs of the at least one microstructure is generated using a generative adversarial network (GAN) that is based on the at least one material property constraint and the at least one neighborhood connectivity constraint.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
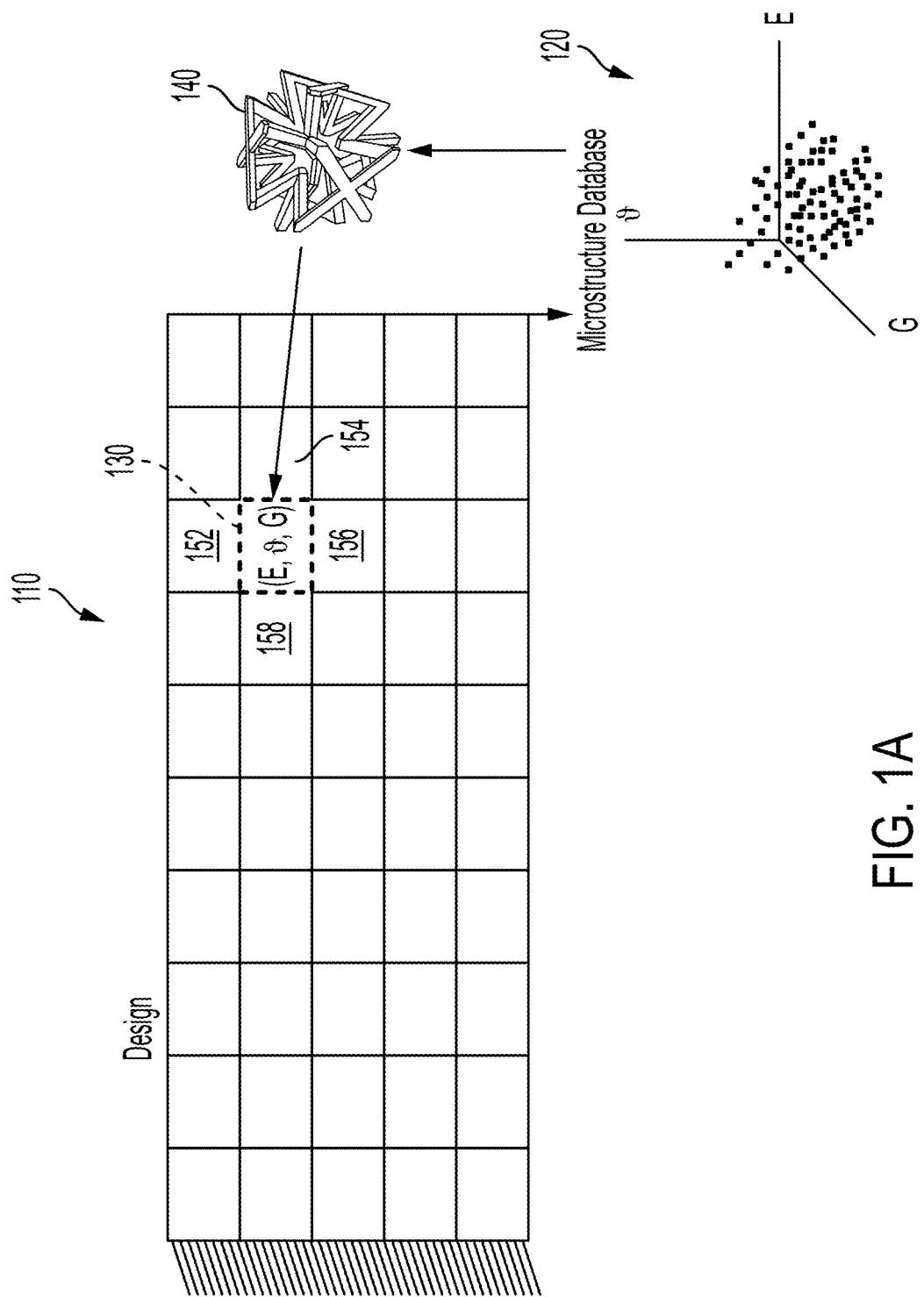
FIG. 1A illustrates a design including a plurality of microstructures in accordance with various embodiments described herein.

The design of parts for multi-scale criteria for desired functionality is challenging because of the diverse physical phenomena occurring at a range of size scales. For example, from the microstructure behavior to the emerging bulk behavior at the macro-scale. The rapid growth in fabrication technology has enabled enormous structural complexity in functional parts, using additive, subtractive, or combined processes. High-resolution multi-material 3D printing techniques, among others, have enabled architecting materials at a level of detail and complexity that is multiple orders of magnitude finer than the part's overall size. The existing computational design tools are, however, unable to explore the immense design space implied by the ability to customize parts at such levels of detail and complexity spanning several length scales (e.g., from microns to meters). The overall performance of the part, on the other hand, depends on physical behavior that occurs at multiple scales, sometimes ranging from the nano-scale to macro-scale phenomena. Analyzing for all of these scales at once is not only impractical because of computational limitations, but also often meaningless. For example, topology optimization has been successful in designing parts for optimized structural deformation and compliance at the macro-scale, but the optimized design can fail due to stress concentrations and crack propagation that are not accounted for as they occur at the micro-scale.

High-performance computing (HPC) is rapidly growing more powerful and affordable. Compute-intensive graphical processing units (GPU) with thousands of processors are arriving at a cost point of a few cents per core, motivating a shift in computational paradigm towards simpler but more parallelizable data structures and algorithms. It may not be necessary (or even desirable) to represent and analyze all details at the finest scale. Different physical phenomena and behavioral requirements are only meaningful at one observation scale or another, while others are so fundamental that are preserved across the scales. For example, statistical fluctuations at the micro-scale of a loaded structure may not be relevant to the mean deformation or strain energy at the macro-scale. Hence, it makes sense to "homogenize" the relevant material properties over neighborhoods within the size scale of millimeters and perform finite element analysis (FEA) at the macro-scale, at which such neighborhoods are small enough discretizations, to design for optimal compliance.

Some preliminary concepts involved in these methods are those of forward and inverse problems. To systematically synthesize designs to fulfill a set of performance requirements by searching the design space (the inverse problem), one needs the ability to analyze a given design to compute its behavior (the forward problem), check it against the required performance criteria, and decide on the next move in the design space if the requirements are not met. This iterative paradigm is fundamental to most design methods where a closed-form solution for the inverse problem does not exist. For physics-based performance requirements, the forward problem is typically solved by numerical methods such as finite element method (FEM), finite difference method (FDM), discrete element method (DEM), cell method, and others. The inverse problem is solved by iterating over candidate designs and repeating the analysis, steered by a variety of techniques such as gradient-descent optimization, stochastic/evolutionary optimization, machine learning, and so on. Unlike forward problems, the solution to the inverse problems is not unique, leaving one with additional flexibilities with regards to design decisions. Among the most popular synthesis paradigms are shape and topology optimization (TO). TO seeks to find the shape (geometry and/or topology) and material distribution(s) in a given domain that lead to optimized performance for a given cost (e.g., mass) under specified boundary conditions.

There is a growing interest in design with high resolutions (i.e., designs with features at multiple length scales) in order to take full advantage of advanced manufacturing technologies such as additive manufacturing. However, most of the time, design of structures with such high resolutions is challenging due to high computational requirements. A common approach to design such structures is to divide the problem into multiple scales such that the design domain is tiled with precomputed microstructures (small-scale assemblies with different macroscale properties than their base materials). These approaches are based on homogenization methods that transmit properties at lower length scales to higher length scales using an averaging process. Homogenization approaches assume periodic boundary conditions that force neighboring microstructures to be identical at the connections. To ensure substantially identical connections, parameterized families of microstructures that are designed to ensure connectivity across neighboring microstructure boundaries are a prevalent solution. Yet, enforcing family constraints when synthesizing microstructures leads to a limited range of bulk material properties. Embodiments described herein tackle the microstructure generation with data driven approaches such that a microstructure can be very quickly generated with the target material properties on the fly for the given neighborhood. The presented learning based approaches described herein may reduce the cost of microstructure design compared to a traditional optimization or search based approach. This way, a microstructure can be generated for a given neighborhood instead of having to select a closest one from precomputed database with family parameterization limitations.

According to embodiments described herein, a database is generated that contains precomputed microstructures along with corresponding bulk properties. The database of microstructures is used to construct objects comprising multiple microstructures. FIG. 1A illustrates a design 110 including a plurality of microstructures. Each of the blocks shown illustrates a potential microstructure. In this example, the system is tasked with finding an example microstructure at location 130 of the design. The example microstructure has parameters Young's modulus (E), Poisson's ratio (ϑ), and shear modulus (G). The example microstructure also may have connectivity between neighborhood interfaces for neighboring microstructures 152, 154, 156, 158. The system uses the microstructure database 120 to find at least one microstructure 140 that substantially complies with the given parameters and that has neighborhood connectivity.

Figure 1B:
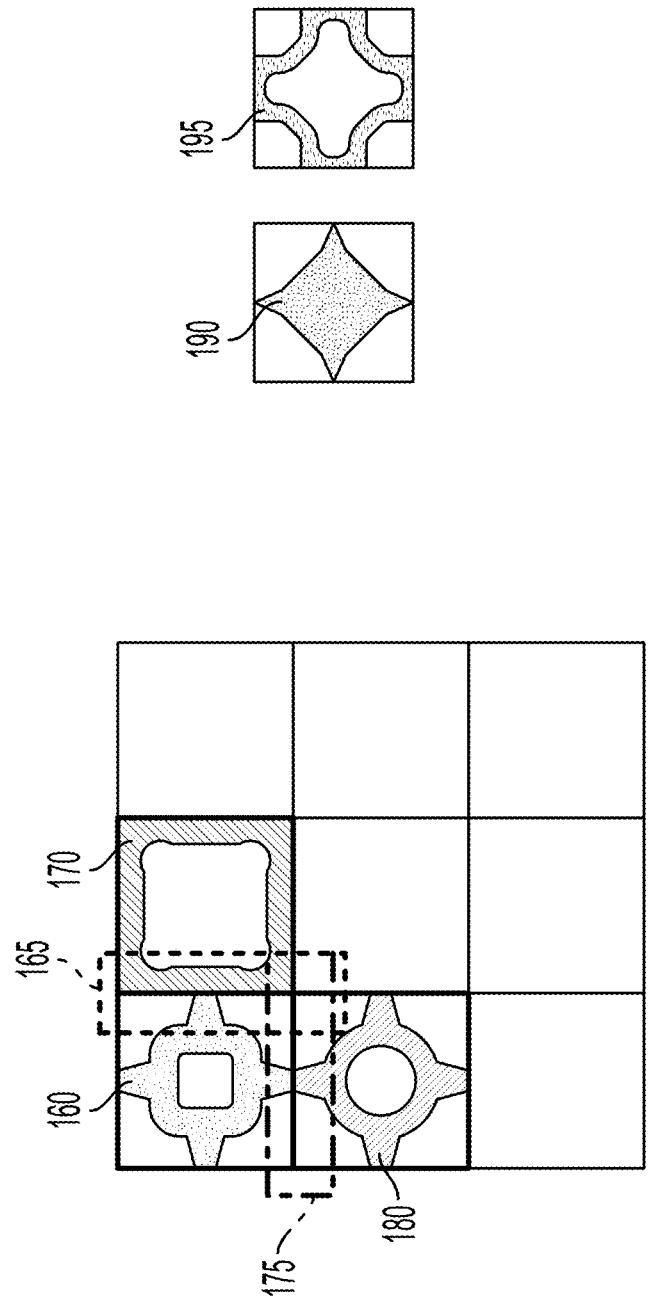
FIG. 1B shows an example of neighborhood connectivity between neighboring microstructures in accordance with embodiments described herein.
Figure 2A:
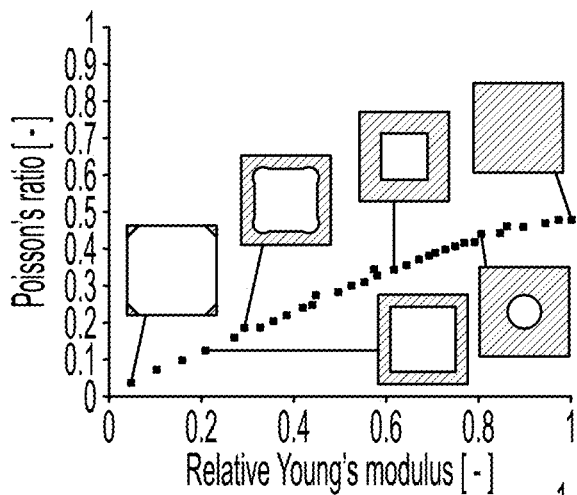
FIG. 2A-2F illustrates parameterized families of microstructures and their corresponding materials in the material property space in accordance with embodiments described herein.
Figure 2B:
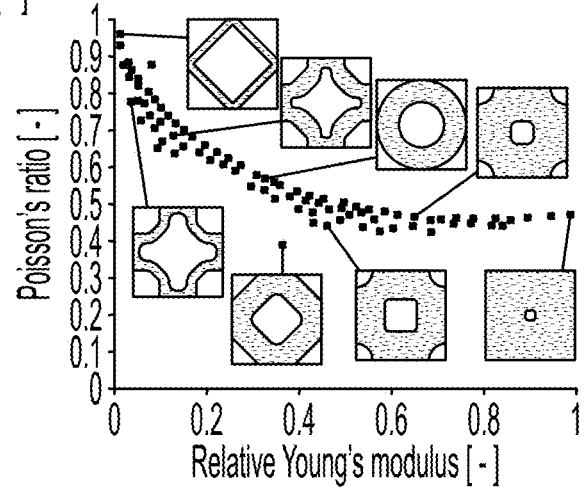
Figure 2C:
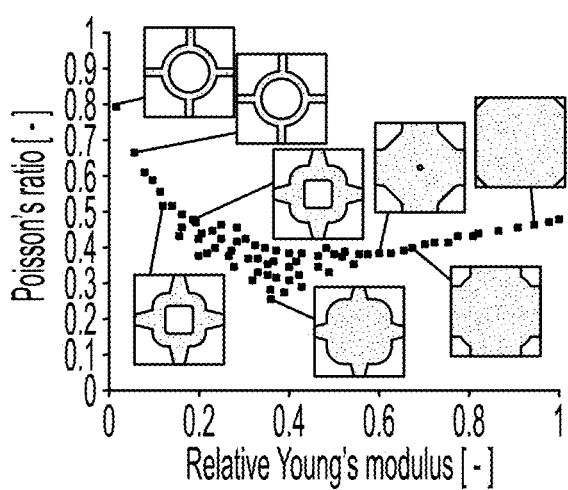
Figure 2D:
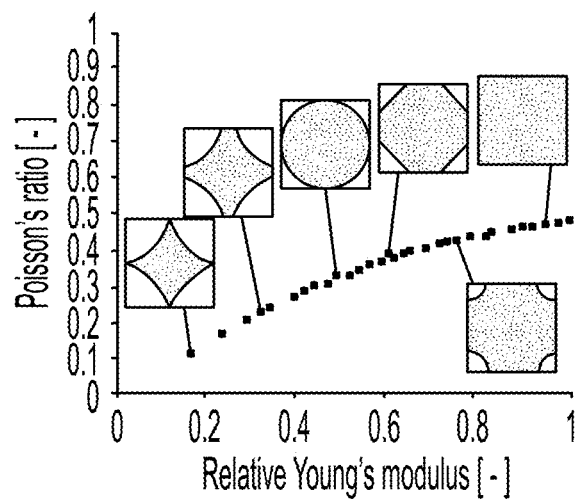
Figure 2E:
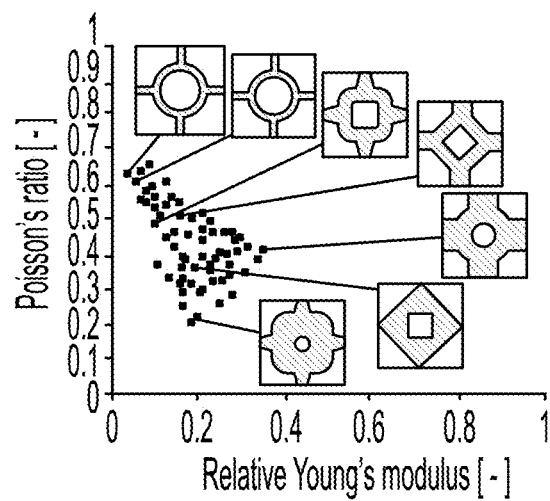
Figure 2F:
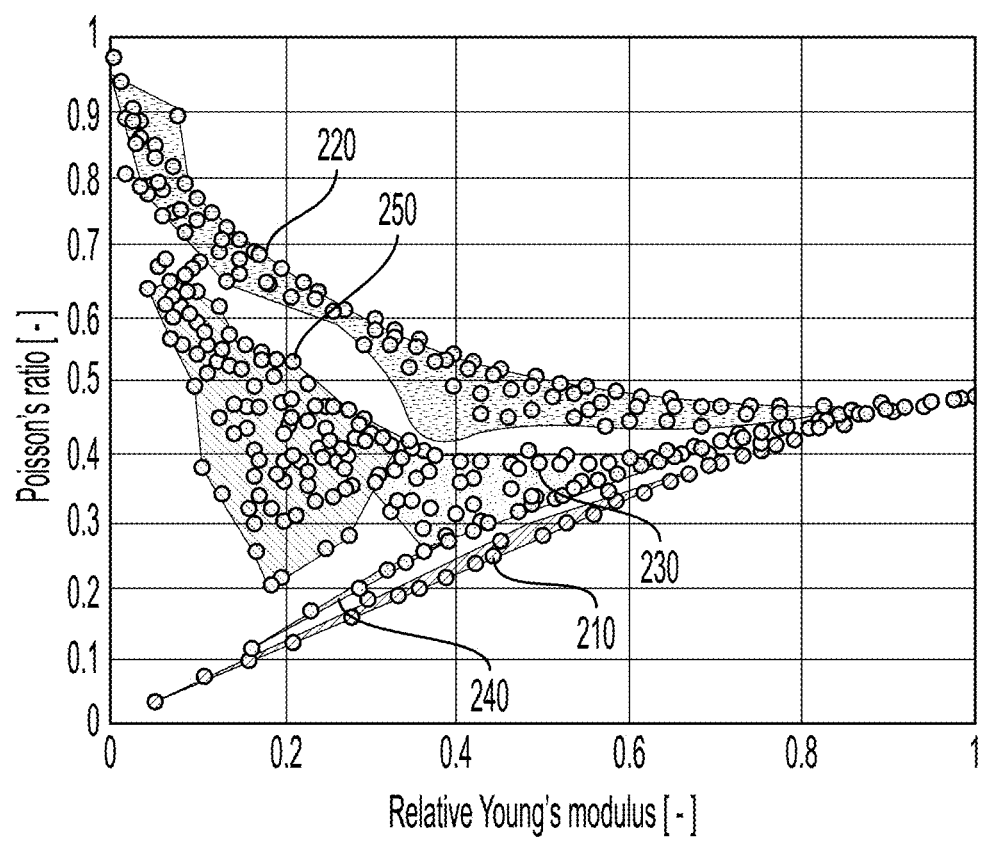

FIG. 1B shows an example of neighborhood connectivity between neighboring microstructures in accordance with embodiments described herein. A first microstructure 160 neighbors a second microstructure 170. As can be observed, the interface 165 between the first microstructure 160 and the second microstructure 170 is a bad connection. A third microstructure 180 neighbors the first microstructure 160. As can be observed, the interface 175 between the first microstructure 160 and the third microstructure 180 is a better connection than the interface 165 between the first microstructure 160 and the second microstructure 170. Fourth microstructure 190 and fifth microstructure 195 represent other potential microstructure families that can be chosen to be part of the larger macrostructure.

In the current state of multi-scale design, a prevalent approach is to generate a database of precomputed microstructures with corresponding bulk properties and assemble these microstructures to construct objects in a larger scale as shown in FIG. 1. To be able to assemble these microstructures, one important criterion is ensuring connectivity at the neighborhood interfaces. In addition to ensuring connectivity, having substantially identical interfaces at the neighborhood boundaries may be used to assume periodic boundary conditions in homogenization theory.

According to embodiments described herein, it may be difficult to ensure neighborhood connectivity and a large number of potentially feasible microstructure designs are omitted when selecting microstructures from a database. FIGS. 2A-2E illustrate five different parameterized families of microstructures and their corresponding materials in the material property space 210, 220, 230, 240, 250, respectively, in accordance with embodiments described herein. To ensure substantially identical neighborhood boundaries of the microstructures, parameterized family representations are used as shown in FIG. 2A-2F. In this example, each microstructure is optimized using the constraints of family representations. When family constraints are enforced during optimization of microstructures, a narrow range of the material property space can be covered. Covering a small domain in the material property space may eventually limit the feasible design space. i.e., limits the minimum weight and/or minimum compliance that may be achieved. Depending on the effectiveness of the parameterization, some feasible designs may actually be classified as infeasible. It has been shown that a much larger portion of the material property space can be covered if family representation restrictions are not enforced during the optimization of microstructures.

Figure 3:
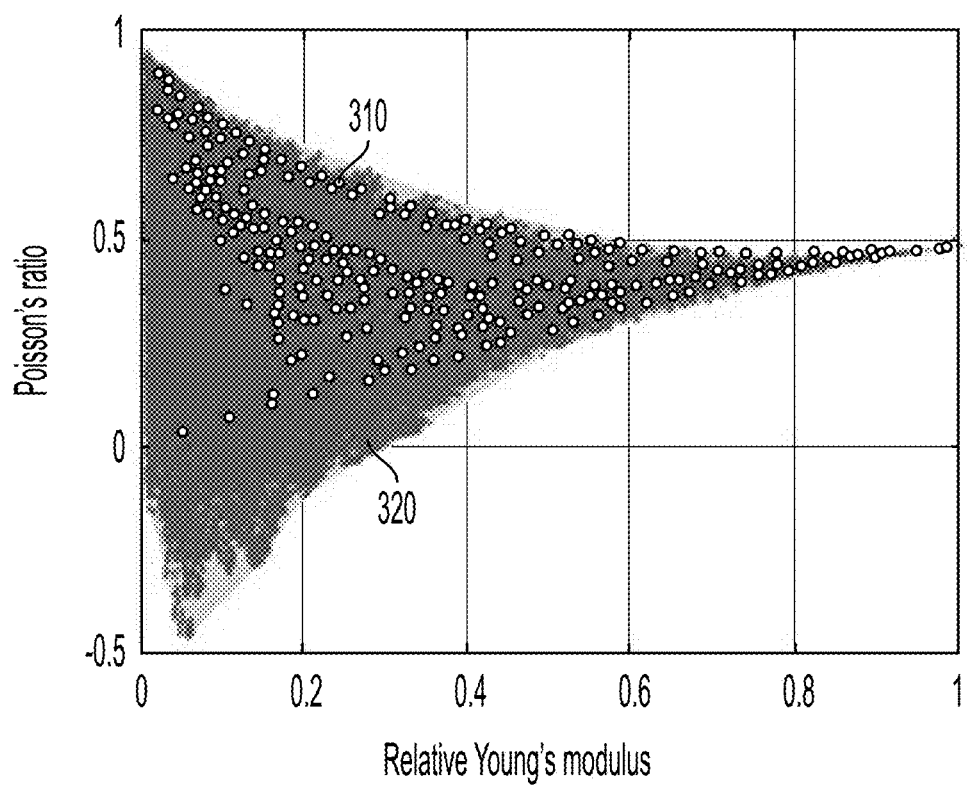
FIG. 3 demonstrates the material property space for Young's modulus and Poisson's ratio is much larger when the design space of microstructures is not limited by family representations in accordance with embodiments described herein.

FIG. 3 demonstrates the material property space for Young's modulus and Poisson's ratio is much larger when the design space of microstructures is not limited by family representations in accordance with embodiments described herein. The slow nature of physics based optimization approaches do not allow generation of each microstructure for the given neighborhood inside another optimization routine for larger scale design. FIG. 3 shows microstructures having parameterized families 310 and microstructures having no family parametrization 320. As can be observed, the microstructures having no family parameterization 320 occupy a much larger design space than those designs with family parameterization 310.

Embodiments described herein involve a method for design of microstructures to quickly generate microstructures on the fly for given neighborhood information and material properties. Generative adversarial networks (GAN) may be used to generate microstructure designs. GANs are a branch of unsupervised machine learning, and may be implemented by a system of two neural networks competing against each other in a zero-sum game framework. The two neural networks are created and learning is performed (i.e., the networks are trained) through their mutual competition. The first neural network is implemented as generator system, and is referred to as the Generator. The second neural network is implemented as discriminator system, and is referred to as the Discriminator. The Generator begins with a random input and attempts to generate synthetic or fake images. The Discriminator receives real authentic images, along with the synthetic images from the Generator. Accordingly, the Discriminator outputs a binary decision indicating a prediction as to whether the image received from the Generator is real or synthetic (i.e., fake). As the Discriminator improves at distinguishing between real image and synthetic images, the Generator improves at generating images to fool the Discriminator. Equilibrium is reached when the Generator can no longer fool the Discriminator. No domain knowledge needs to be explicitly included. Image features are learned automatically. The fitness function for the generator is learned and not predefined. In conditional GANs (CGANs), instead of generating a sample from a random input, the Generator generates an output image conditioned on an input image. Such a system can then be trained to learn mappings from the input image space to the output or generated image space. The training process consists in learning the optimal set of values of a plurality of parameters that determine the mapping. In other words, the mapping can be thought of as a functional mapping with parameters that are adjustable, and are learned based on a set of training samples.

An inverse design problem of generating microstructures for target material properties is formulated as a learning problem via GANs. This formulation allows costly inverse design processes to be quick operations as opposed to slow physics based design routines. This property provides the means for on the fly design of microstructures for given neighborhood information in a multi-scale design setting. By training the GAN with many microstructures, a proxy for the forward problem can be created. Therefore, instead of solving the inverse problem that traditionally invokes several solvers in multiple iterations, microstructures can be created through one generator pass. According to embodiments described herein, a combination of GANs and physics-based techniques are used to provide potential microstructure designs.

Figure 4:
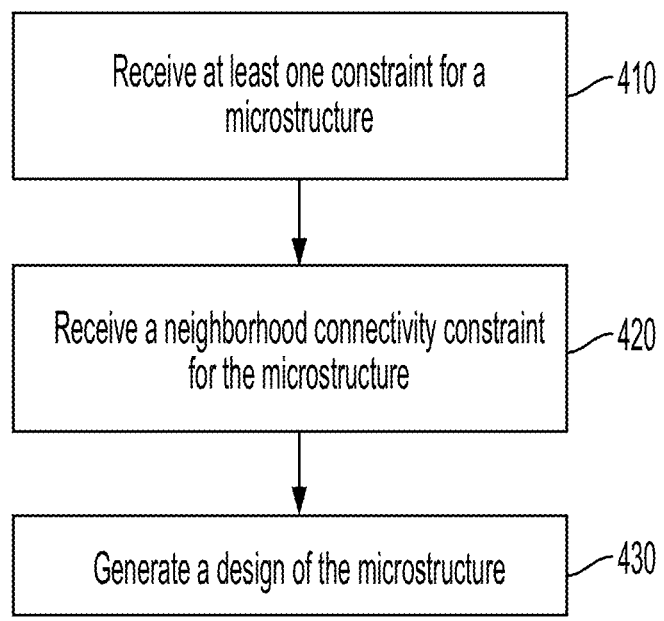
FIG. 4 illustrates a process for generating a microstructure design in accordance with embodiments described herein.

FIG. 4 illustrates a process for generating a microstructure design in accordance with embodiments described herein. At least one material property constraint for a design of at least one microstructure is received 410. According to various configurations the at least one material property constraint is received via a user interface from a user. In some cases, the at least one material property constraint is automatically generated. In some cases, the at least one material property constraint is at least partially generated by receiving input from a user and at least partially generated automatically. According to embodiments described herein, the at least one microstructure is configured to be a part of a larger macrostructure. The one or more microstructures may comprise small-scale assemblies with one or more different macro-scale properties than their base materials.

At least one neighborhood connectivity constraint for the design of the at least one microstructure is received 420. According to embodiments described herein, the at least one neighborhood connectivity constraint comprises substantially identical interfaces at neighborhood boundaries. Like the material property constraint, the at least one neighborhood connectivity constraint may be generated automatically and/or manually.

One or more designs of the at least one microstructure is generated 430 using a GAN that based at least in part on the at least one material property constraint and the at least one neighborhood connectivity constraint. According to embodiments described herein, the GAN is trained using one or more training microstructures. It is to be understood that the GAN may comprise any type of GAN. For example, the GAN may comprise one or more of a conditional GAN (CGAN), a multi-conditional GAN (MC-GAN), a Wasserstein GAN (WGAN), a least squares GAN (LSGAN), and a deep convolutional GAN (DCGAN). According to embodiments described herein, the GAN is configured to produce the one or more designs by inverse design of microstructures through one or more of physical test data and simulated data. In some implementations, the GAN is configured to produce the one or more designs on the fly as part of a macro-scale design optimization algorithm where the material property constraints are determined.

Figure 5:
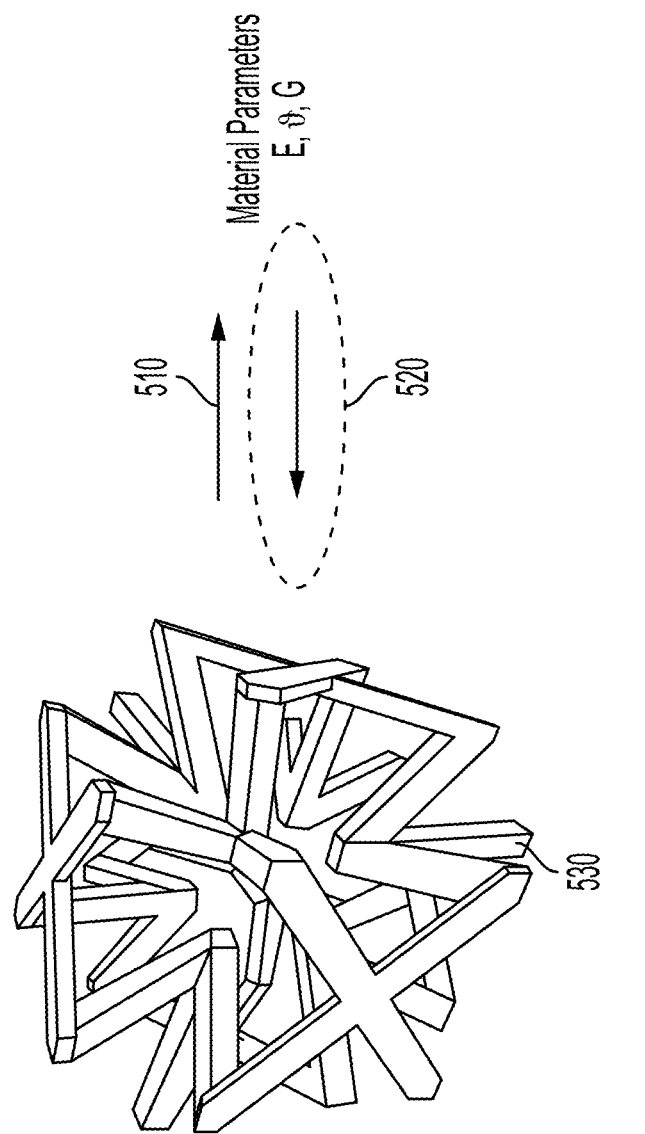
FIG. 5 demonstrates forward and inverse mappings between microstructure geometry and material properties in accordance with embodiments described herein.

FIG. 5 demonstrates forward and inverse mappings between microstructure geometry and material properties (e.g., Young's modulus (E) Poisson's ratio ($\vartheta$), and Shear modulus (G)) in accordance with embodiments described herein. The forward mapping may be a relatively simple problem. The inverse problem may be a challenging problem since the mapping from low dimensional data (material parameters) from high dimensional information (microstructure geometry) may be difficult. GANs may be used for the inverse design problem of finding microstructure geometry for given target material properties. FIG. 5 shows forward 510 and inverse 520 mapping problem between geometry and material properties of a microstructure 530.

Figure 6:
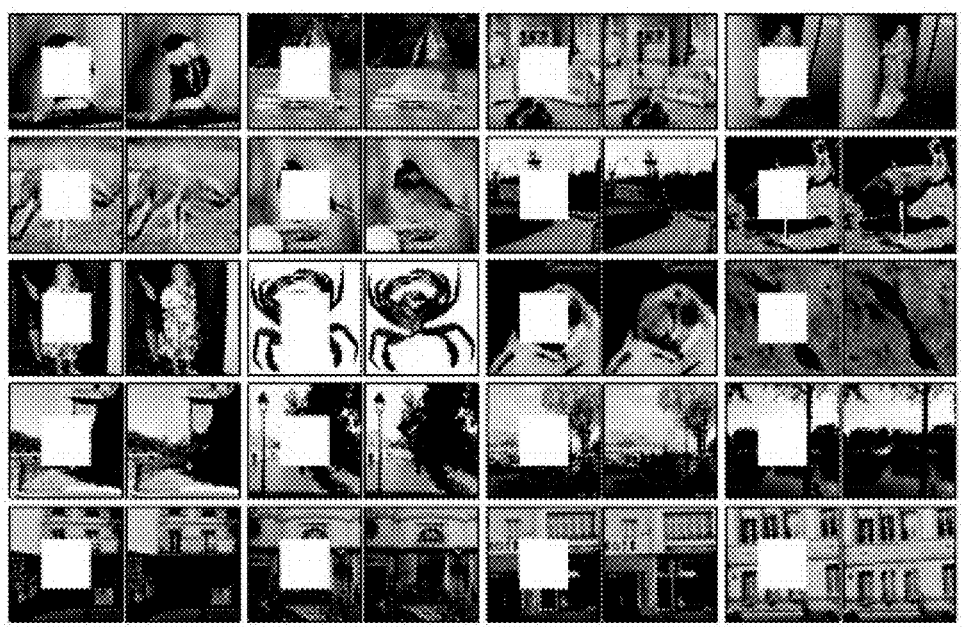
FIG. 6 shows an image of an example application where GANs are used for context-based synthesis such that missing part of an image is synthesized by using border pixel information in accordance with embodiments described herein.
Figure 7:
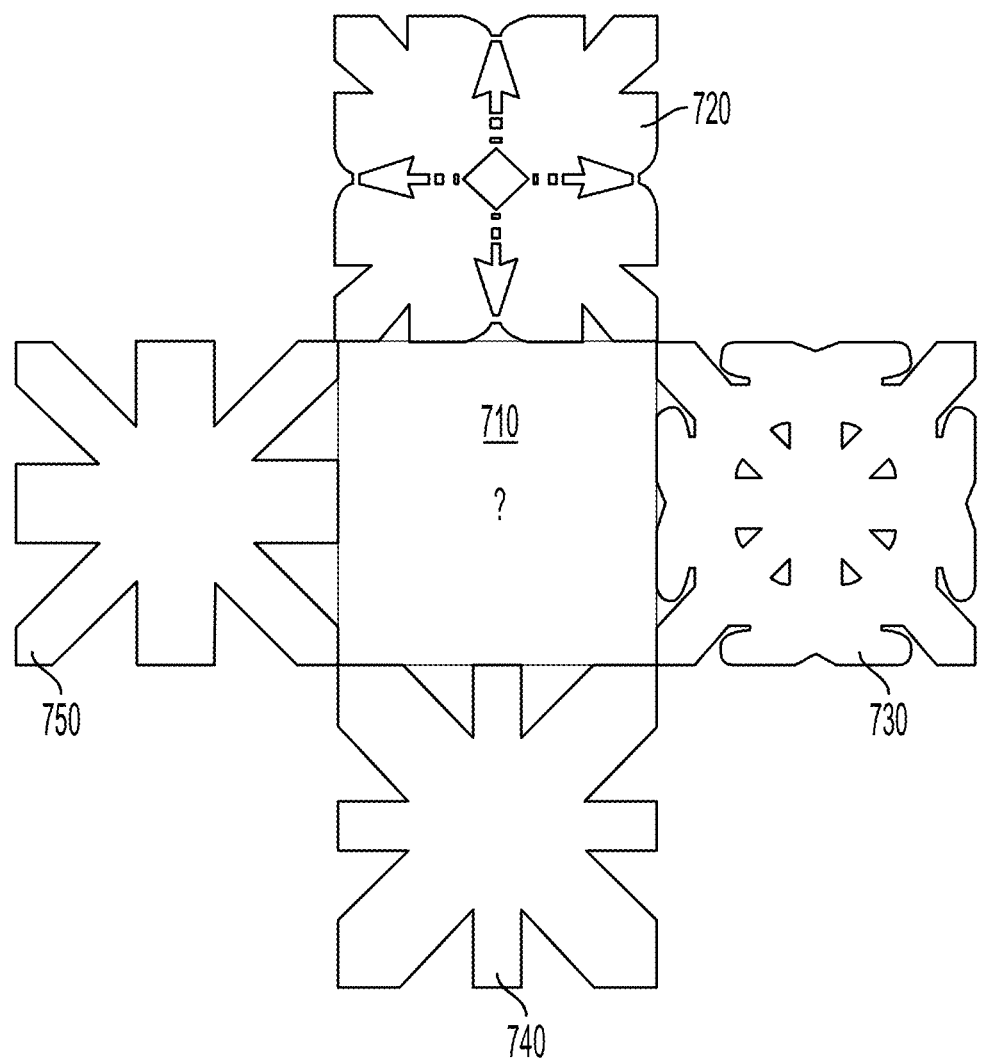
FIG. 7 illustrates context-based synthesis that corresponds to designing microstructures for the given neighborhoods in accordance with embodiments described herein.

According to embodiments described herein, CGANs may be used for automatic synthesis with target specifications by conditioning GANs on specifications in various computer vision applications. FIG. 6 shows an image of an example application where GANs are used for context-based synthesis such that missing part of an image is synthesized by using border pixel information. In this example, context-based synthesis corresponds to designing microstructures for the given neighborhoods. FIG. 7 shows an example of using context-based synthesis in the design of a microstructure 710 for a neighborhood having existing microstructures 720, 730, 740, 750. According to embodiments described herein, multi-conditional GAN (MC-GAN) approach may be used to design microstructures. MC-GAN controls both the object specification and the context of image similar to controlling material properties and neighborhood connectivity. While, the preceding examples discuss particular types of GANS that can be used to create microstructures, it is to be understood that any type of GAN and/or machine learning techniques that can solve the inverse problem can be used. In some cases, a combination of methods are used to produce microstructure designs.

Figure 8:
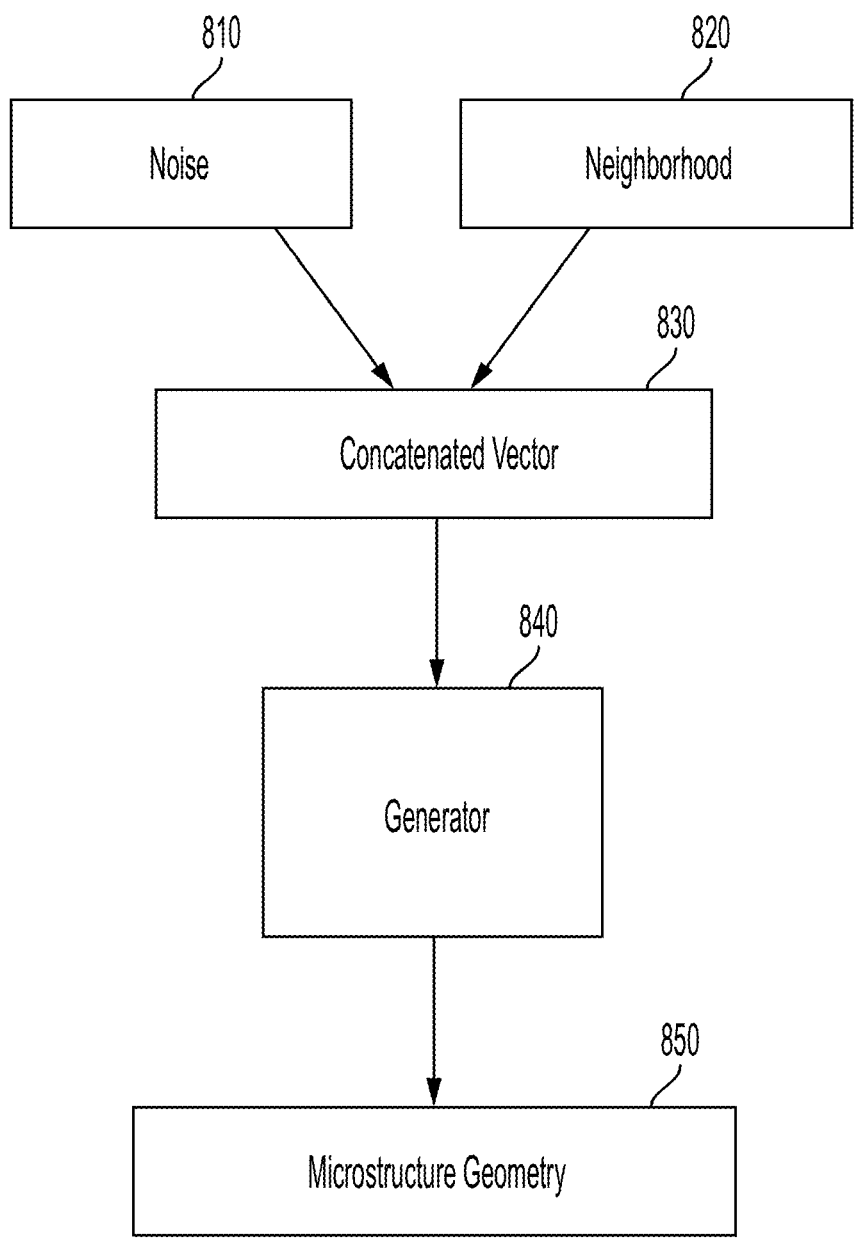
FIG. 8 shows illustrates an example process for producing microstructure designs in accordance with embodiments described herein.

FIG. 8 shows illustrates an example process for producing microstructure designs in accordance with embodiments described herein. Neighborhood information 820 and random noise 810 are used to create a concatenated vector 830. The neighborhood information may include information about neighborhood interfaces, for example. The concatenated vector 830 containing both the noise 810 and the neighborhood information 820 is input into the Generator 840. The Generator 840 uses the concatenated vector 830 to create at least one example microstructure geometry design 850 configured to fit in the neighborhood.

Figure 9A:
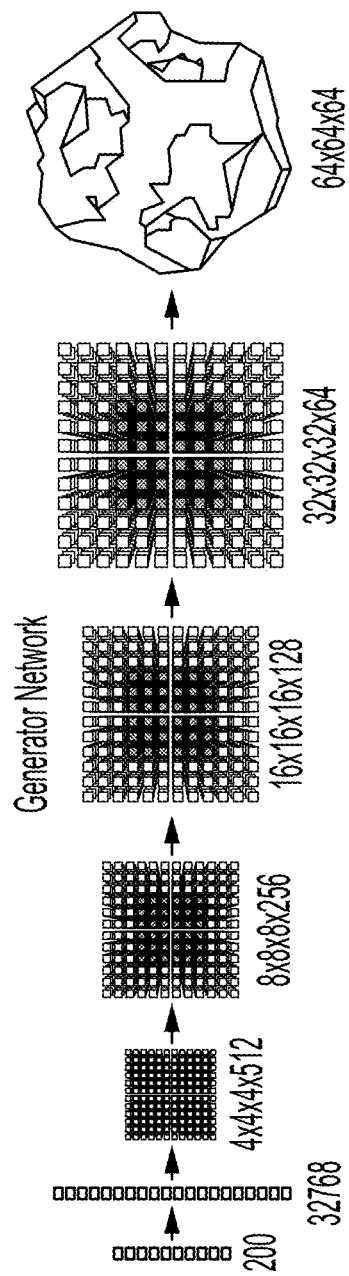
FIGS. 9A and 9B show the GAN architecture with the generator and discriminator to design microstructures in accordance with embodiments described herein.
Figure 9B:
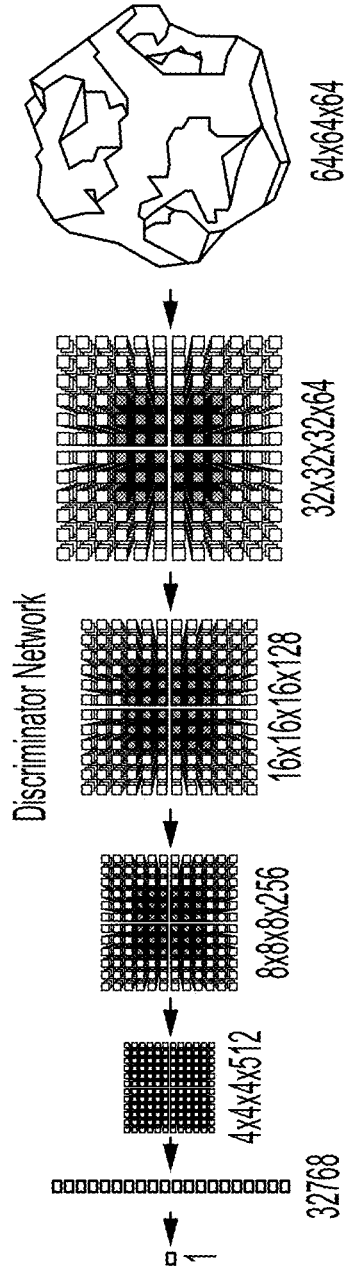

FIGS. 9A-9B show the GAN architecture with the generator and discriminator to design microstructures in accordance with embodiments described herein. FIG. 9A demonstrates the generator that consists of convolutional neural networks. The input to the neural network is the concatenated vector of noise and condition information (e.g., noise and neighborhood in FIG. 8). After going through five fully convolutional layers the input vector results in the 64×64×64 voxel representation of the microstructure. In between each convolutional neural network layer, we add batch normalization and ReLU layers and we use sigmoid layer after the last convolutional layer. Discriminator presented in FIG. 9B is a convolutional neural network that is a mirrored version of the generator network. The discriminator network takes the microstructure geometry as input and outputs a real number for the probability of the input microstructure being real or fake.

Figure 10A:
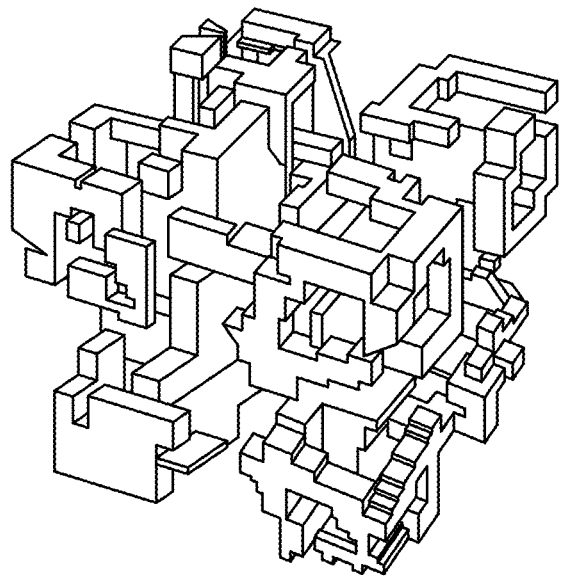
FIGS. 10A and 10B show a microstructure that is generated by embodiments described herein and the most similar microstructure in the dataset, respectively in accordance with embodiments described herein.
Figure 10B:
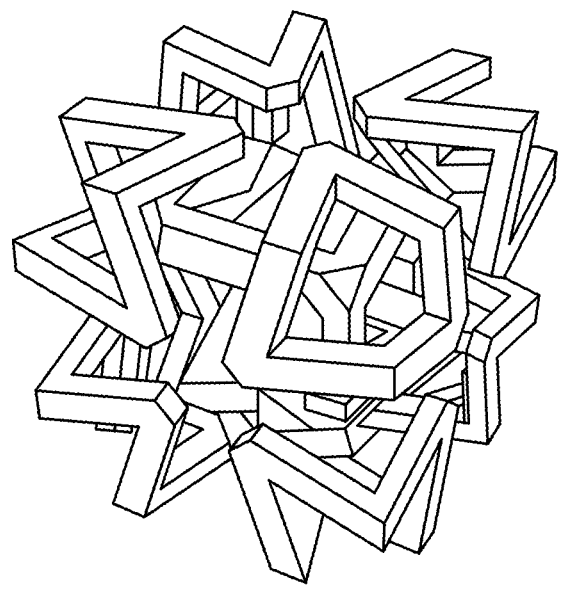

The process described herein enables generation of new microstructures that are significantly different than the given dataset in the database. FIGS. 10A and 10B show a microstructure that is generated by embodiments described herein and the most similar microstructure in the dataset, respectively. As can be observed, the design of FIG. 10A is very different than the design of FIG. 10B demonstrating capabilities of GANs to generate new unique structures. The dissimilarity of the structures of FIGS. 10A and 10B can be measured using Jaccard dissimilarity.

Figure 11:
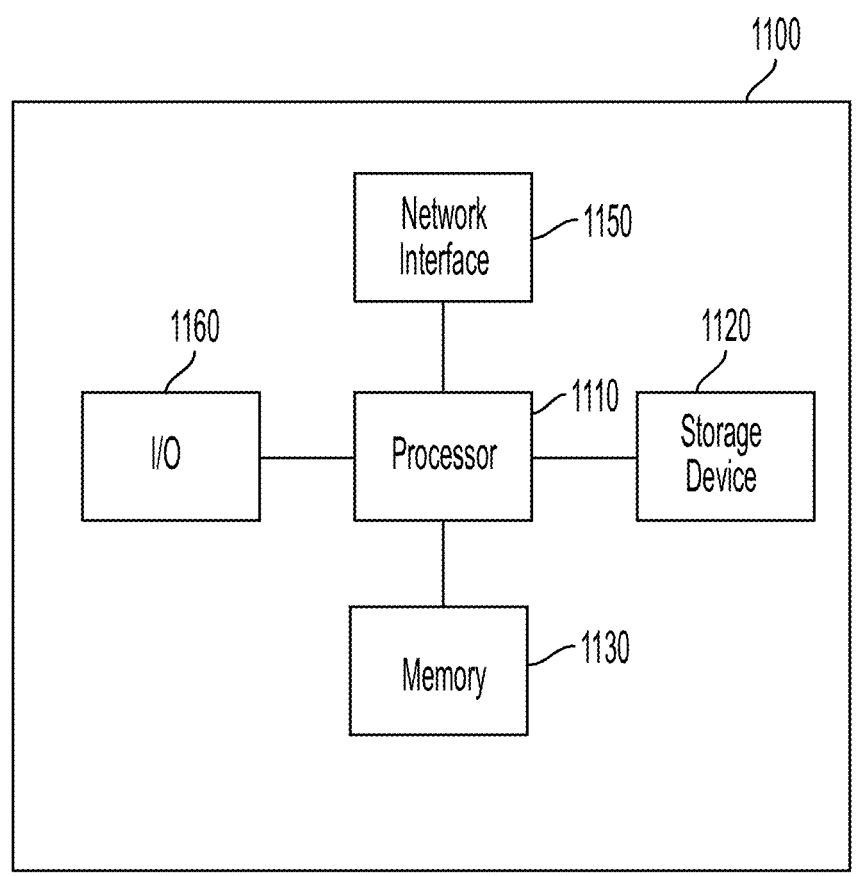
FIG. 11 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 11. Computer 1100 contains a processor 1110, which controls the overall operation of the computer 1100 by executing computer program instructions which define such operation. It is to be understood that the processor 1110 can include any type of device capable of executing instructions. For example, the processor 1110 may include one or more of a central processing unit (CPU), a graphical processing unit (GPU), a field-programmable gate array (FPGA), and an application-specific integrated circuit (ASIC). The computer program instructions may be stored in a storage device 1120 (e.g., magnetic disk) and loaded into memory 1130 when execution of the computer program instructions is desired. Thus, the steps of the methods described herein may be defined by the computer program instructions stored in the memory 1130 and controlled by the processor 1110 executing the computer program instructions. According to embodiments described herein, the computer 1100 may perform method steps as part of a server or cloud based service. The computer 1100 may include one or more network interfaces 1150 for communicating with other devices via a network. The computer 1100 also includes other input/output devices 1160 that enable user interaction with the computer 1100 (e.g., display, keyboard, mouse, speakers, buttons, etc. FIG. 11 is a high level representation of possible components of a computer for illustrative purposes and the computer may contain other components.

The computer system 1100 includes a GAN framework with generator and discriminator components for generating microstructures. The generator and discriminator is implemented using a set of neural networks and trained together using a microstructure dataset with material properties and neighborhood information. The training procedure finds and stores the weights associated with the neural networks in the memory system of 1100. After the training process, the weights are used to generate microstructures for the given material property and neighborhood information.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method designing microstructures, comprising:
receiving at least one material property constraint for a design of at least one microstructure, the at least one microstructure configured to be a part of a larger macrostructure;
receiving at least one neighborhood connectivity constraint for the design of the at least one microstructure; and
generating one or more designs of the at least one microstructure using a generative adversarial network (GAN) based on the at least one material property constraint and the at least one neighborhood connectivity constraint, wherein the GAN comprises a multi-conditional GAN that controls both the at least one material property and the at least one neighborhood connectivity constraint using context-based synthesis derived from computer vision applications.

2. The method of claim 1, wherein the at least one neighborhood connectivity constraints comprise substantially identical interfaces at neighborhood boundaries.

3. The method of claim 1, further comprising training the GAN with one or more training microstructures.

4. The method of claim 1, wherein the GAN is configured to produce the one or more designs by inverse design of microstructures through one or more of physical test data and simulated data.

5. The method of claim 1 wherein the GAN is configured to produce the one or more designs on the fly as part of a macro-scale design optimization algorithm where the material property constraints are determined.

6. The method of claim 1, wherein the one or more microstructures comprise small-scale assemblies with one or more different macro-scale properties than their base materials.

7. A system for designing microstructures, comprising:
a processor; and
a memory coupled to the processor, the memory storing computer executable instructions, that, when executed by the processor, cause the system to:
receive at least one material property constraint for a design of at least one microstructure, the at least one microstructure configured to be a part of a larger macrostructure;
receive at least one neighborhood connectivity constraint for the design of the at least one microstructure; and
generate one or more designs of the at least one microstructure using a generative adversarial network (GAN) based on the at least one material property constraint and the at least one neighborhood connectivity constraint, wherein the GAN comprises a multi-conditional GAN that controls both the at least one material property and the at least one neighborhood connectivity constraint using context-based synthesis derived from computer vision applications.

8. The system of claim 7, wherein the at least one neighborhood connectivity constraints comprise substantially identical interfaces at neighborhood boundaries.

9. The system of claim 7, wherein the processor is configured to train the GAN with one or more training microstructures.

10. The system of claim 7, wherein the GAN is configured to produce the one or more designs by inverse design of microstructures through one or more of physical test data and simulated data.

11. The system of claim 7 wherein the GAN is configured to produce the one or more designs on the fly as part of a macro-scale design optimization algorithm where the material property constraints are determined.

12. The system of claim 7, wherein the one or more microstructures comprise small-scale assemblies with one or more different macro-scale properties than their base materials.

13. A non-transitory computer readable medium storing computer program instructions for designing microstructures, the computer program instructions when executed by a processor cause the processor to perform operations comprising:
receiving at least one material property constraint for a design of at least one microstructure, the at least one microstructure configured to be a part of a larger macrostructure;
receiving at least one neighborhood connectivity constraint for the design of the at least one microstructure; and
generating one or more designs of the at least one microstructure using a generative adversarial network (GAN) based on the at least one material property constraint and the at least one neighborhood connectivity constraint, wherein the GAN comprises a multi-conditional GAN that controls both the at least one material property and the at least one neighborhood connectivity constraint using context-based synthesis derived from computer vision applications.

14. The non-transitory computer readable medium of claim 13, wherein the at least one neighborhood connectivity constraints comprise substantially identical interfaces at neighborhood boundaries.

15. The non-transitory computer readable medium of claim 13, further comprising training the GAN with one or more training microstructures.

16. The non-transitory computer readable medium of claim 13, wherein the GAN is configured to produce the one or more designs by inverse design of microstructures through one or more of physical test data and simulated data.

17. The non-transitory computer readable medium of claim 13, wherein the GAN is configured to produce the one or more designs on the fly as part of a macro-scale design optimization algorithm where the material property constraints are determined.

18. The non-transitory computer readable medium of claim 13, wherein generating the one or more designs of the at least one microstructure using the GAN comprises solving an inverse design problem of determining target material properties for the at least one microstructure, the target material properties formulated as a learning problem via the GAN.

19. The method of claim 1, wherein generating the one or more designs of the at least one microstructure using the GAN comprises solving an inverse design problem of determining target material properties for the at least one microstructure, the target material properties formulated as a learning problem via the GAN.

20. The system of claim 7, wherein generating the one or more designs of the at least one microstructure using the GAN comprises solving an inverse design problem of determining target material properties for the at least one microstructure, the target material properties formulated as a learning problem via the GAN.

* * * * *